US006428148B1

(12) United States Patent
Gore

(10) Patent No.: US 6,428,148 B1
(45) Date of Patent: Aug. 6, 2002

(54) PERMANENT IMAGES PRODUCED BY USE OF HIGHLY SELECTIVE ELECTROSTATIC TRANSFER OF DRY CLEAR TONER TO AREAS CONTACTED BY INK

(75) Inventor: Makarand P. Gore, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/629,784

(22) Filed: Jul. 31, 2000

(51) Int. Cl.[7] .............................. B41J 2/06; B41J 2/01; B41J 2/41; G11B 3/00

(52) U.S. Cl. ......................... 347/55; 347/101; 747/112

(58) Field of Search ......................... 347/55, 112, 101; 427/466, 458; 430/57; 399/341, 342

(56) References Cited

U.S. PATENT DOCUMENTS

| | | | | |
|---|---|---|---|---|
| 4,095,233 A | | 6/1978 | Goffe | |
| 4,312,268 A | | 1/1982 | King et al. | 101/1 |
| 4,571,066 A | * | 2/1986 | Morrison | 355/15 |
| 4,710,780 A | | 12/1987 | Saito et al. | |
| 4,751,531 A | | 6/1988 | Saito et al. | |
| 4,751,532 A | | 6/1988 | Fujimura et al. | |
| 4,752,782 A | | 6/1988 | Saito et al. | |
| 4,752,783 A | | 6/1988 | Saito et al. | |
| 4,752,784 A | | 6/1988 | Saito et al. | |
| 4,943,816 A | | 7/1990 | Sporer | |
| 5,128,695 A | | 7/1992 | Maeda | |
| 5,153,611 A | | 10/1992 | Kokado et al. | |
| 5,200,769 A | | 4/1993 | Takemura et al. | |
| 5,298,926 A | | 3/1994 | Fukushima et al. | |
| 5,546,108 A | | 8/1996 | Hotomi et al. | 347/55 |
| 5,592,262 A | | 1/1997 | Tanaka et al. | |
| 5,598,195 A | | 1/1997 | Okamoto et al. | 347/55 |
| 5,619,234 A | | 4/1997 | Nagato et al. | 347/55 |
| 5,627,578 A | | 5/1997 | Weintraub | 347/101 |
| 5,646,659 A | | 7/1997 | Moriyama et al. | 347/55 |
| 5,672,458 A | | 9/1997 | Tutt et al. | 430/124 |
| 5,729,785 A | | 3/1998 | Sakaizawa et al. | |
| 5,754,199 A | | 5/1998 | Miki et al. | 347/55 |
| 5,767,879 A | | 6/1998 | Tsukamoto et al. | |
| 5,780,118 A | | 7/1998 | Tracy et al. | 427/508 |
| 5,835,114 A | | 11/1998 | Nagata et al. | 347/55 |
| 5,838,349 A | | 11/1998 | Choi et al. | 347/55 |
| 5,847,738 A | | 12/1998 | Tutt et al. | 347/101 |
| 5,889,541 A | | 3/1999 | Bobrow et al. | 347/55 |
| 5,926,194 A | | 7/1999 | Hagiwara | 347/55 |

FOREIGN PATENT DOCUMENTS

| | | |
|---|---|---|
| JP | 11 2633004 | 9/1999 |

* cited by examiner

*Primary Examiner*—John Barlow
*Assistant Examiner*—Michael S. Brooke

(57) ABSTRACT

The present invention relates to ink-jet inks in combination with a clear, dry toner to produce a permanent ink-jet image. In particular, this invention relates to an ink system that utilizes the addition of specific toner/developers, typically found in the laser printer field, with aqueous based in-jet inks. These dual systems produce a permanent image that is resistant to image degradation factors such as mechanical abrasion, light, water, and solvents such as the ones used in highlighter markers.

11 Claims, 1 Drawing Sheet

PERMANENT IMAGES PRODUCED BY USE OF HIGHLY SELECTIVE ELECTROSTATIC TRANSFER OF DRY CLEAR TONER TO AREAS CONTACTED BY INK

TECHNICAL FIELD

The present invention relates to ink-jet inks in combination with a clear, dry toner to produce a permanent ink-jet image. In particular, this invention relates to an ink system that utilizes the addition of specific toner/developers, typically found in the laser printer field, with aqueous based in-jet inks. These dual systems produce a permanent image that is resistant to image degradation factors such as mechanical abrasion, light, water, and solvents such as the ones used in highlighter markers.

BACKGROUND ART

Along with the computerization of offices in the 1980's came electronically controlled non-impact printers such as the ink jet and laser printers. Drop-on-demand inkjet printers can be piezo or thermal (bubble jet). In piezo ink jet systems, ink droplets are ejected by an oscillating piezo crystal. However, the thermal ink jet dominates the drop-on-demand office ink jet market. In this system, rapid heating behind the ink nozzles cause a bubble of vapor to form in the ink. The resulting bubble expansion and ink ejection from the inkjet printer cartridge causes printing to appear on the substrate.

Full-color inkjet printers are more common than color lasers and are much more economical. The main advantage of inkjet printers over lasers and other non-impact printing techniques include their low cost and simplicity. Thermal inkjet systems are capable of dispensing ink rapidly and accurately. The technology of this and other inkjet systems are discussed in the *Chemistry and Technology of Printing and Imaging Systems*, edited by P. Gregory, published by Chapman & Hall, 1996. Representative thermal inkjet systems and cartridges are discussed in U.S. Pat. No. 4,500,895 to Buck et al., U.S. Pat. No. 4,513,298 to Scheu, and U.S. Pat. No. 4,794,409 to Cowger et al., which are all hereby incorporated by reference.

The technology of inkjet printers has undergone many changes and improvements since they first appeared. Research has been conducted to ensure that the images produced are of consistent high quality. Thus, it is important that the images be permanent by being waterfast, smearfast, smudgefast, run-fast, and the like when exposed to chemical or mechanical abrasion. Non-smearing of the image when portions of the printed page are highlighted with colored markers is of particular interest. Oftentimes, the image produced by the inkjet printer on paper is not satisfactorily fixed and smears, blurring the printed image when subjected to highlighting. This type of image is not regarded as permanent.

Image permanence is defined as transference of color from the substrate when the image printed thereon is subjected to chemical and mechanical abrasion. Highlighting is oftentimes the form of chemical and mechanical abrasion experienced. This transference of color is measured by Optical Density (OD). More permanent images have lower milli-Optical Density (mOD) values.

Another desired feature of printed images is light fastness. As used herein, light fastness will mean that the images do not fade when exposed to light. Light fastness is another measure of permanence as used herein. Light fastness is measured by exposing printed images to intense light in light chambers (fadomers) and comparing print density before and after the exposure.

There have been many past attempts at improving the permanence of water-based inkjet printing systems. Included among these attempts are U.S. Pat. No. 5,549,740 to Takahashi et al., U.S. Pat. No. 5,640,187 to Kashiwakazi et al., and U.S. Pat. No. 5,792,249 to Shirota et al. which utilizes an additional or "fifth" pen to apply a colorless fluid on to the substrate. As will be seen in the comparative testing, the mOD values for the images printed thereon are quite high. Another printing technology that is inherently more permanent than water-based inkjet are hot-melt inks. These materials are solid at room temperature and are similar to wax crayons. The colorants used in these materials are solvent dyes that are soluble in the ink vehicle or pigment dispersions. Like laser toners, these materials are incompatible with the inks used in inkjet printing.

U.S. Pat. Nos. 5,817,169 and 5,698,017, both to Sacripante et al., disclose hot melt ink compositions which use oxazoline as a vehicle used for the colorant in a nonaqueous, hot melt inkjet ink. One of the advantages of this technology is the waxy nature of the hot melt ink creates images that are more waterfast and may be successfully utilized on plain papers. This technology is in contrast with the instant invention, which utilizes an ordinary aqueous four-color ink pen set.

Another highly efficient printing system in common use currently is laser printers. In a laser printer or copier, light from a laser beam is used to discharge areas of a photoreceptor to create an electrostatic image of the page to be printed. The image is created by the printer controller, a dedicated computer in the printer, and is passed to the print engine. The print engine transcribes an array of dots created by the printer controller into a printed image. The print engine includes a laser scanning assembly, photoreceptor, toner hopper, developer unit, Corotrons, discharge lamp, fuser, paper transport, paper input feeders, and paper output trays.

The final stage of laser printing or copying is to fix toner onto the paper. Toner is very fine plastic powder, which is transferred from the photoreceptor. Once transferred from the photoreceptor, it lies on the paper in a very thin coating with nothing to hold it in place. In order to fix the toner to the paper, it is heated by passing between a pair of very hot rollers, so that the plastic melts around the fibers of the paper and is "fused" into place. The image is now fixed permanently onto the paper.

The fuser of a typical laser printer is of particular interest to the printing system of this invention. In these systems, fusing or melting the polymeric resin in which the colorant is embedded converts the discrete toner particles into an amorphous film. This film becomes the permanent image that results in electrophotographic copy or laser printed copy. However, the laser printer toners are incompatible with water. Since most inkjet materials are water-based, it is not possible to use laser toners in inkjet printers, and, therefore, Inkjet technology has not yet found a way to make the printed image permanent.

U.S. Pat. No. 4,943,816 to Sporer discloses the use of a dye-less fluid for latent imaging. The dye and ink are omitted and a colorless marking fluid is used to create a latent image to be developed in a subsequent step. Omitting the dye is believed to prolong the printhead life.

U.S. Pat. No. 4,312,268, to King et al., describes a mechanical transfer of clear or colored toner to a wet image. The mechanical transfer is not by electrostatic transfer. The powdered material adheres to the wet surfaces and the rest falls down into the housing.

U.S. Pat. No. 5,847,738, to Tutt, describes the application of a total overcoat over inkjet prints as a separate process in a sequential fashion.

Accordingly, a need remains for a printing system using water-based inkjet technology, yet, will produce permanent laser-like images. These permanent images will be consistent and stable with respect to a variety of printed substrates. An ideal situation would be combining the convenience and safety of aqueous inkjet inks with the permanence of electrophotographic copies. The present invention satisfies this in a unique manner, which is described herein.

DISCLOSURE OF INVENTION

In accordance with the invention, a method of printing utilizing both inkjet printing and electrography is provided in which certain inks are printed onto a substrate or media, followed by application of electrophotographic toners only onto the specific printed areas on the substrate. Once fused, the image is permanent and resistant to abrasion, light, water and solvents. Further, the substrate is not totally coated by fusible toner, so it has a different feel to the hand and can be used differently (and absorbs differently) than a substrate that has been fully coated by toner. As used herein, "substrate" and "media" are used interchangeably and includes any materials onto which an inkjet image can be printed. Typically this includes papers, films, transparencies, plastics, textiles, etc.

Without being limited by theory, it is believed that conventional water based ink jet inks are conductive and permit electrical filed for a short period of time after contacting an insulator media, such as paper or plastic film. Thus, it has been found that inks are capable of neutralizing the charges residing on the surface of insulator media. A toner "cloud," maintained by electrical fields in the vicinity of such media, would transfer toner particles only to areas exposed to ink, if the particles and media have the same charge polarity. Upon contacting the surface, the particle produces images that have permanence equal to the ones printed by lasers or copiers. This allows a method to transfer dry toners specifically to areas exposed to ink drops using inkjet printing. The principle components and methods of the device for this invention are as follows.

BEST MODES FOR CARRYING OUT THE INVENTION

Figure 1:
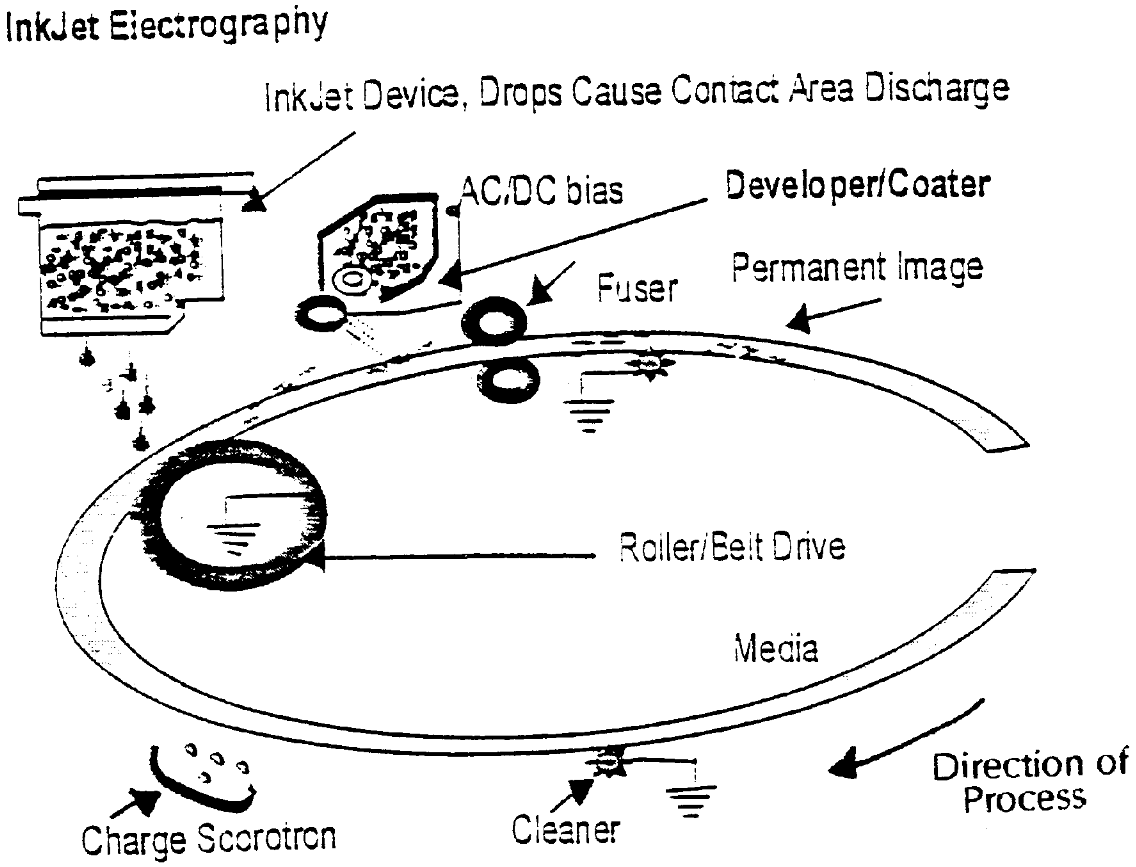
FIG. 1 is a schematic of the printing method according to the present invention.

As can be seen in FIG. 1, the following steps are utilized, combining inkjet printing and electrostatic toners to produce a permanent image without altering the feel or coating on the rest of the substrate. Thus, discrete areas of the substrate contain ink and toner and discrete areas are substantially (cannot be visually or tactually detected with the hand) free of ink and toner.

Charging the Media

The media is preferably charged to a given polarity prior to printing. In the charging step, the media is covered with ions of a selected polarity using a high voltage wire, grid, or charge roller. The media should have the same polarity as the toner/developer material. Useful devices for charging the media include the use of a scorotron or a coronetrun. Charging the media is well known in the art of electrophotography. See U.S. Pat. Nos. 4,478,870, 4,423,951, and 4,041,312, hereby incorporated by reference.

Inkjet Printer

Ink-jet printing is a non-impact printing process in which droplets of ink are deposited on print media, such as paper, transparency film, or textiles. Inkjet printers are generally lower in cost and offer high quality output compared to other types of printers. Inkjet printing involves the ejection of fine droplets of ink onto print media in response to electrical signals generated by a microprocessor. Two options for achieving ink droplet ejection in ink-jet printing: thermally and piezoelectrically. In thermal ink-jet printing, the energy for drop ejection is generated by electrically- heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor. The ejection of ink droplets in a particular order forms alphanumeric characters, area fills, and other patterns on the print medium.

Ink-jet printers and inkjet print engines are well known in the art. Representative thermal inkjet systems and cartridges are discussed in U.S. Pat. Nos. 4,500,895 to Buck et al., 4,513,298 to Scheu, and 4,794,409 to Cowger et al., which are all hereby incorporated by reference.

Developing Mechanism

The dry toner of use herein has a thermoplastic binding component. Other components may be added to the toner formulation to enhance certain properties or performance characteristics of the toners. These include additives to control the rate and level of charge and additives for enhancing flow. Oil is sometimes added in the fusing process to inhibit adhesion of the toner to the fuser rollers.

In this invention, the toner is selectively attracted to the ink on the media surface, which has acted to neutralize the polarity or charge on the media. The media may be either positively or negatively charged, and the toner system similarly should contain the same charge. In the transfer step, media, most often in the form of a sheet of paper, is given an electrostatic charge the same as that of the toner, the media is then subjected to inkjetting which causes the areas exposed to the ink to lose its charge. The media is then passed along in close proximity to the developer surface to transfer toner and, consequently, the toner is transferred only to the areas exposed to ink. Following transfer of the toner, the media is passed between a pair of fuser rollers. The pressure and heat of the rollers fixes the toner in the media.

The developing mechanism, which acts to transfer the toner, may consist of a charged roller, a clear toner hopper, stirrer, wiper blade, and a source of AC/DC voltage biases. The toners or precursors used in this invention are polymers, charge control agents, stabilizers, and other components typically found in electrophotographic toners. Such polymers and materials are commercially available from Clariant, Image polymers, Sybron, Zeneca and others.

Among the properties of interest for application of some of the developer polymers useful herein include glass transition temperature (Tg) and Melt Index (MI). As used herein, glass transition temperature (Tg) will mean the transition that occurs when a liquid is cooled to an amorphous or glassy solid. It also may be the change in an amorphous region of a partially crystalline polymer from a viscous, rubbery state to a hard or brittle one brought about by change in temperature. In this invention, the materials which are used to improve permanence of the images produced by inkjet printing fluid have a Tg that may range from about 40 to about 140 degrees C. A more preferred range of glass transition temperatures will range from about 50 to about 90 degrees C. Melt index (MI) values for the instant materials may range from about 400 to about 3000 grams/10 minutes. A more preferred range may be from about 1800 to about 2500 grams/10 minutes. A still more preferred range is from about 2000 and 2250 g/10 min.

Presented herein are representative examples of syntheses of fusible polymers that provide permanence to the images formed by the materials and processes of the instant invention.

The first groups of polymers are synthesized by condensation reactions to "graft" substitutes on a "backbone" polymer chain. For example, a polymer of styrene/maleic anhydride of molecular weight 1600 (average) is treated with ammonium hydroxide in refluxing tetrahydrofuran, THF, to produce an amide-acid derivative; the derivative is then treated with additional ammonium hydroxide or ammonium bicarbonate and water. Evaporation of THF will give the aqueous polymer. The average molecular weight of the polymers herein can range from about 900 to about 500,000, preferably from about 1,000 to about 100,000, even more preferably from about 1,000 to about 50,000.

In another example, a polymer of styrene/maleic anhydride of molecular weight 1900 (wt average) is treated with PEG amine in anhydrous refluxing THF to produce an amide-acid derivative; as before, the derivative is treated with butyl amine to give the desired polymer. In yet another example, (olefin) styrene/maleic anhydride polymer of MW 1900 is treated with PEG 350 methylether (0.5 equivalent to PEG to anhydride ratio) in refluxing THF, followed by butyl amine to produce the aqueous solution of the polymer. In all instances the resulting polymers have suitable Tg to form films.

Thus, the fusible materials above can be selected from amide-acid derivatives of alkene/maleic anhydride and ammonium hydroxide polymers; amide-acid derivatives of alkene/maleic anhydride and polyethylene glycol (PEG) amine polymers; polymers of alkene/maleic anhydride and adducts with PEG (having a molecular weight of about 100 to about 5,000) monomethyl ethers; and mixtures or precursors thereof. See U.S. patent applications, Ser. No. 09/295,665, Preparation of Improved Inks for Inkjet Printers Using Specific Polymers, and Ser. No.09/296,456, Preparation of Improved Inks for Inkjet Printers both filed Apr. 21, 1999, hereby incorporated by reference. The structures and chemistry useful in the practice of invention is as shown in FIG. 1:

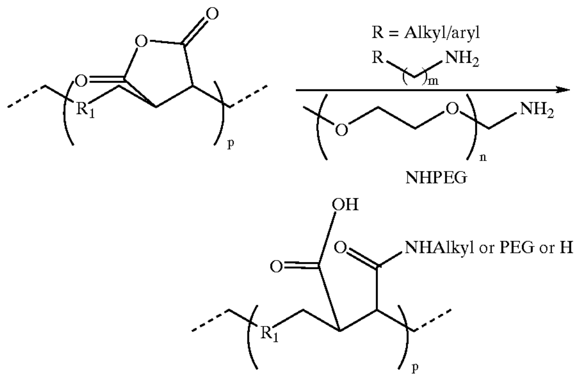

R1 = CH2Ph, STY/MA
m = 0, 18
n = 3 - 1000
p = 2 - 1000 wherein m, n, and p represent repeating units, wherein m is from 0 to about 18, n is from about 3 to about 1,000, and p is from about 2 to about 1,000. R1 can be a branched alkyl chain with aromatic or aliphatic groups or a straight chain alkyl group along the main polymer chain with from about C2 to C50, preferably from about C2 (ethylene) to about C8 (Octyl) carbons; R can be an alkyl chain, a branched alkyl chain, or ring of from about C2 to about C50, of which some carbons may be hydroxylated. The counterion for carboxylate groups in water solution may be an ammonium species or a metal cation.

The second special group of compounds useful for the practice of the invention is polyoxazolines, polyoxazolins, and intermediates and precursors thereof. As shown in Figure 2, below, and described in literature (See for example, U.S. Pat. Nos. 5,817,169; 5,629,396; 5,644,006; 5,670,590; 5,240,744; and 4,658,011 herein, incorporated by reference), compounds of this series are converted by effect of heat, dehydration and catalytic polymerization. One example useful herein is Poly-2-ethyl-2-oxazoline available from Polymer Chemistry Innovations, Tucson, Ariz., but it will be apparent to any one familiar with the art that other amides, oxazolines, and polymers can be used in the practice of this invention to impart thermosetting properties to printed inks.

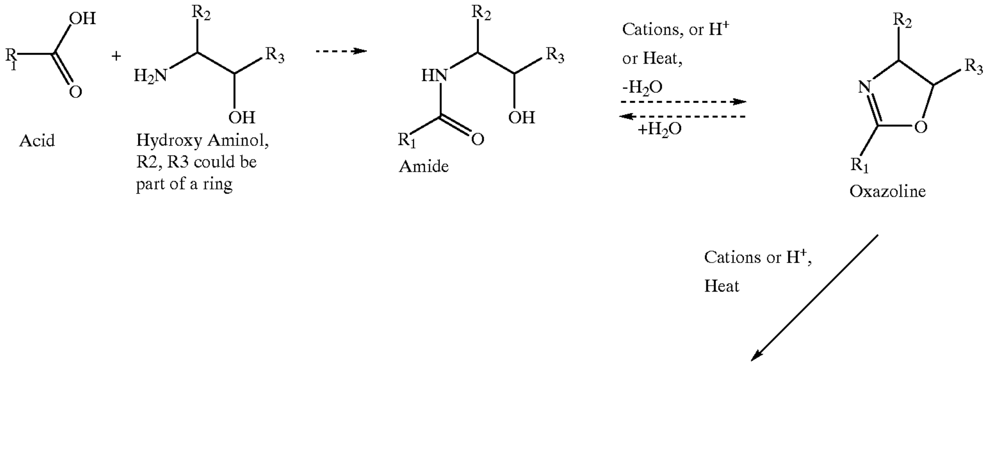

-continued

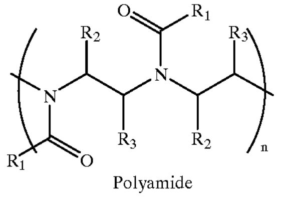

Polyamide wherein R1, R2 and R3, independently, can be H, alkyl chains, branched alkyl chains or rings of between C2 and C50; some carbons may be in hydroxylated form.

One class of clear laser or copier toners are polymers made from a variety of materials such as polyoxazolins, urethan/acrylic block or blended polymers, and polymers made from acrylate monomers, such as silicone acrylate (commercially available from the Sartomer Company, (Exton PA)), polycarbonates, polyvinylpyrrolidine, styrene-butadiene latexes, PEG-amine modified and/or diamine cross linked polyene-maleic anhydride such as ethylene maleic anhydride or octadecene-maleic anhydride, or rosin-maleic anhydride polymers.

Most of the toners materials listed supra are hydrophobic polymers. They are present in electrophotography as small, discrete grains that outline the image on a substrate prior to fusion. As such, these materials have been incompatible with and not viable for use in water-based inkjet inks. This invention utilizes wet-able analogs of this type of hydrophobic material, heretofore incompatible with water to create permanent images.

Presented herein are representative examples of syntheses of fusible materials that provide permanence to the images formed by the materials and processes of the instant invention: Acrylate esters such as methyl acrylate or methacrylate and methyl butylacrylate, along with vinyl aromatic monomers, such as styrene.

Other monomers used to an emulsion polymer (or latex) may be an alkyl acrylate or methacrylate. These alkyl acrylates or methacrylates comprise alkyl groups with from one to about twelve carbon alkyl groups. Among these are included methyl methacrylate, butyl acrylate, butyl methacrylate, hexyl acrylate and the like.

Among the vinyl aromatic monomers that are contemplated for inclusion in this invention are styrene, substituted styrene, divinyl benzene, vinyltoluene, vinyl naphthalene, polyvinylbenzenes, and isomers thereof. A preferred vinyl aromatic monomer is styrene.

The fusible material that imparts permanence to the printed substrate that is a product of this invention is not limited to emulsion polymers. In fact, the fusible material does not have to be polymeric.

Fuser Mechanism

The printing system of this invention includes a printing apparatus that is equipped with suitable heating means. Heat fusion is most often the way that the image formed by toner particles used in electrophotography are fixed to the printed substrate. Most systems employ a heated roller to fix the image although any other means of supplying heat is included within the scope of this invention.

The heated roller is often a rubber roller impregnated with silicone oil, which is preheated to about 90° C. It may also be a metal roller heated with incandescent light or a lamp equipped with a reflector. Certain laser printers employ a ceramic heating element in the fusion stage. When the copier or printer is switched on, waiting time until the machine is ready to use is associated with heating the roller.

The heating means is designed to melt (or fuse) the toner on to the substrate. In high-speed systems, flash fusion may be used. Flash fusion involves the use of heated lamps with a specific heat output are used to rapidly heat the toner which then adheres to the substrate. Fusers are commercially available from such companies that manufacture laser printers such as Hewlett-Packard, Canon, Ricoh, and Panasonic. In all cases, the toner particles used in Electrophotography are hydrophobic.

A typical laser printer commonly available is the Hewlett-Packard Laser Jet 4L Printer. In the fusing stage, toner is fused into the substrate by heat and pressure to produce a permanent image. The substrate (usually paper) passes between a ceramic-heating element protected by a thin Teflon sleeve and a soft pressure roller. This melts the toner and presses it into the substrate. Other laser printers use a halogen-heating lamp and require frequent warm-up periods to maintain a minimum temperature.

What is claimed is:

1. A method for creating a permanent inkjet image comprising the steps of:

(a) first charging a substrate with a given polarity;

(b) inkjet printing a fluid onto said charged substrate such that the fluid dissipates the charge on the substrate in the areas contacted with printed fluid;

(c) depositing a clear toner onto the substrate; wherein said clear toner has a polarity the same as said charged substrate;

(d) subjecting said substrate from step (c) to fusing.

2. The method of claim 1 wherein a thermal ink-jet printer is used to ink-jet print.

3. The method of claim 1 wherein a piezoelectric printer is used to ink-jet print.

4. The method of claim 1 wherein said toner has a Tg from about 40 to about 140° C.

5. The method of claim 4 wherein said toner has a Tg from about 50 to about 90° C.

6. The method of claim 4 wherein said toner is selected from the group consisting of: amide-acid derivatives of alkene/maleic anhydride and ammonium hydroxide polymers; amide-acid derivatives of alkene/maleic anhydride and polyethylene glycol (PEG) amine polymers; polymers of alkene/maleic anhydride and adducts with PEG (having a molecular weight of about 100 to about 5,000) monomethyl ethers; and mixtures or precursors thereof.

7. The method of claim 4 wherein said toner is selected from the group consisting of: polyoxazolines; polyoxazolins; polyoxazolines intermediates and precursors; polyoxazolins intermediates and precursors; urethan/acrylic block or blended polymers; polymers made from silicone acrylate, polycarbonates, polyvinylpyrrolidine, styrene-butadiene latexes, PEG-amine modified, or diamine cross linked polyene-maleic anhydride; acrylate esters; vinyl aromatic monomers; monomers of emulsion polymers; alkyl acrylates; methacrylates; and mixtures thereof.

8. The method of claim 7 wherein said methacrylate mononmers are selected from the group consisting of methyl methacrylate, butyl acrylate, butyl methacrylate, hexyl acrylate, and mixtures thereof.

9. The method of claim 7 wherein said vinyl aromatic monomers are selected from the group consisting of: styrene, substituted styrene, divinyl benzene, vinyltoluene, vinyl naphthalene, polyvinylbenzenes, isomers thereof, and mixtures thereof.

10. The method of claim 1 wherein said toner has a MI from about 400 to about 3000 grams/10 minutes.

11. The method of claim 1 wherein said toner has a MI from about 1800 to about 2500 grams/10 minutes.

* * * * *